United States Patent
Yokota

(10) Patent No.: US 8,320,268 B2
(45) Date of Patent: Nov. 27, 2012

(54) COMMUNICATION CONTROL APPARATUS, RADIO COMMUNICATION APPARATUS, COMMUNICATION CONTROL METHOD AND RADIO COMMUNICATION METHOD

(75) Inventor: Tomoyoshi Yokota, Yokohama (JP)

(73) Assignee: Kyocera Corporation, Kyoto (JP)

(*) Notice: Subject to any disclaimer, the term of this patent is extended or adjusted under 35 U.S.C. 154(b) by 603 days.

(21) Appl. No.: 12/517,037

(22) PCT Filed: Nov. 28, 2007

(86) PCT No.: PCT/JP2007/072987
§ 371 (c)(1),
(2), (4) Date: Aug. 28, 2009

(87) PCT Pub. No.: WO2008/066089
PCT Pub. Date: Jun. 5, 2008

(65) Prior Publication Data
US 2010/0074165 A1  Mar. 25, 2010

(30) Foreign Application Priority Data

Nov. 29, 2006 (JP) ................ P2006-322675

(51) Int. Cl.
  *H04J 3/14*   (2006.01)
  *H04J 1/10*   (2006.01)
  *H04J 3/08*   (2006.01)
  *H04L 12/26*  (2006.01)
  *H04B 7/15*   (2006.01)
(52) U.S. Cl. ....................... 370/252; 370/315
(58) Field of Classification Search .......... None
  See application file for complete search history.

(56) References Cited

U.S. PATENT DOCUMENTS

| 6,002,690 | A  | * | 12/1999 | Takayama et al. | 370/437 |
| 6,650,630 | B1 | * | 11/2003 | Haartsen | 370/345 |
| 2006/0159084 | A1 | * | 7/2006 | Shimizu et al. | 370/389 |
| 2006/0262786 | A1 | * | 11/2006 | Shimizu et al. | 370/389 |
| 2007/0104127 | A1 | * | 5/2007 | Suh et al. | 370/328 |

FOREIGN PATENT DOCUMENTS

| JP | 2003-124980 | 4/2003 |
| JP | 2004096247 A | 3/2004 |
| JP | 2005-277481 | 10/2005 |
| JP | 2006-060579 | 3/2006 |

OTHER PUBLICATIONS

Japanese language office action dated Jul. 11, 2011 and its English language translation for corresponding Japanese application 2006322675.
Japanese language office action dated Feb. 1, 2011 and its English language translation for corresponding Japanese application 2006322675.
C. Perkins, "IP Mobility Support (RFC2002)", Oct. 1996, IETF, Mar. 15, 2006.

* cited by examiner

*Primary Examiner* — Andrew Chriss
(74) *Attorney, Agent, or Firm* — DLA Piper LLP (US)

(57) ABSTRACT

A communication control apparatus calculates a bandwidth ratio Ri based on a received number of IP packets received from a radio communication apparatus within a window T2. The bandwidth ratio Ri indicates a ratio of the bandwidth of a radio IP network 10A to be used for receiving IP packets within a window T3 following the window T2, to the bandwidth of a radio IP network 10B to be used for receiving IP packets within the window T3. The communication control apparatus then transmits, to the radio communication apparatus, a complementary bandwidth amount notification message from which the calculated bandwidth ratio Ri is recognizable.

10 Claims, 6 Drawing Sheets

COMMUNICATION CONTROL APPARATUS, RADIO COMMUNICATION APPARATUS, COMMUNICATION CONTROL METHOD AND RADIO COMMUNICATION METHOD

CROSS-REFERENCE TO RELATED APPLICATIONS

This application is a national stage of international application no. PCT/JP2007/072987, filed on Nov. 28, 2007, and claims the benefit of priority under 35 USC 119 of Japanese Patent Application No. 2006-322675, filed on Nov. 29, 2006, the entire contents of which are incorporated herein by reference.

TECHNICAL FIELD

The present invention relates to a communication control apparatus, a radio communication apparatus, a communication control method and a radio communication method for performing communication via a radio IP network by using a care-of IP address.

BACKGROUND ART

In a radio communication network using an Internet protocol (IP) suite (hereinafter abbreviated as a "radio IP network" as needed), a so-called mobile IP is provided to improve mobility or a radio communication apparatus (for example, Non-patent Document 1).

The mobile IP uses a care-of IP address (care-of address) which is dynamically assigned according to a position of a radio communication apparatus.

Non-patent Document 1: C. Perkins, "IP Mobility Support (RFC2002)", [online], October 1996, IETF, [searched on Heisei 18-3-15 (Mar. 15, 2006)], Internet <URL: http://www.ietf.org/rfc/rfc2002.txt>

DISCLOSURE OF INVENTION

Nowadays, an environment in which the radio communication apparatus can use multiple radio IP networks (for example, a cellular phone network and a wireless LAN network) is being provided.

However, the following problem arises when the radio communication apparatus uses the multiple radio IP networks according to the mobile IP described above. Specifically, in the mobile IP, a care-of IP address is assigned to the radio communication apparatus in each of the radio IP networks. The radio communication apparatus can use only one care-of IP address assigned by any one of the radio IP networks. Thus, the radio communication apparatus cannot "simultaneously" use the multiple radio IP networks.

Consequently, when the radio communication apparatus executes handover to another radio IP network, ongoing communication is interrupted. Furthermore, "seamless" use of multiple radio IP networks is also difficult. For example, when a radio IP network in use for ongoing communication runs short of a bandwidth, it is difficult to complement the insufficient bandwidth by using another radio IP network.

Therefore, the present invention has been made in consideration of the foregoing circumstances. It is an objective of the present invention to provide a communication control apparatus, a radio communication apparatus, a communication control method and a radio communication method, which are capable of complementing an insufficient bandwidth by using another radio IP network, in a case where a radio IP network in use for ongoing communication runs short of a bandwidth while using multiple radio IP networks simultaneously.

In order to solve the aforementioned problem, the present invention includes the following characteristics. To being with, a first characteristic of the present invention is summarized as a communication control apparatus (switching server 100) for controlling a communication path for a radio communication apparatus (MN 300) by using a first radio IP network (radio IP network 10A) which dynamically assigns a first care-of IP address (care-of IP address A1) to the radio communication apparatus according to a position of the radio communication apparatus, and a second radio IP network (radio IP network 10B) which assigns a second care-of IP address (care-of IP address A2) to the radio communication apparatus, the communication control apparatus comprising: a relay unit (packet relay unit 105) configured to receive IP packets transmitted at predetermined intervals from the radio communication apparatus (IP telephone terminal 42) to a communication destination (IP telephone terminal 42) via the first radio IF network, and to relay the received IP packets to the communication destination; an uplink bandwidth ratio calculator (bandwidth calculator 107) configured to calculate an uplink bandwidth ratio (bandwidth ratio Ri) based on a received number of the IP packets received by the relay unit from the radio communication apparatus within a monitoring period (window T2), the uplink bandwidth ratio indicating a ratio of a bandwidth of the first radio IP network to a bandwidth of the second radio IP network, the bandwidths of the first and second radio IP networks being to be used for receiving the IP packets between completion or the monitoring period and completion of a next monitoring period (window T3); and an uplink transmission controller (main controller 111) configured to transmit, to the radio communication apparatus, uplink bandwidth ratio information (complementary bandwidth amount notification message) from which the uplink bandwidth ratio calculated by the uplink bandwidth ratio calculator is recognizable.

According to the characteristic, the communication control apparatus calculates the uplink bandwidth ratio based on the received number of IP packets received from the radio communication apparatus, and transmits, to the radio communication apparatus, the uplink bandwidth ratio information from which the calculated uplink bandwidth ratio is recognized. Thus, the radio communication apparatus can sort the IP packets into the first radio IP network and the second radio IP network based on the received uplink bandwidth ratio information.

Specifically, the communication control apparatus can simultaneously use the multiple radio IP networks and, when the radio IP network used for ongoing communication runs short of a bandwidth, can complement the insufficient bandwidth by another radio IP network. More specifically, the multiple radio IP networks are not simply switched, but can be "seamlessly" used.

A second characteristic of the present invention is summarized an the radio communication terminal according to the first characteristic, wherein the uplink bandwidth ratio calculator calculates the uplink bandwidth ratio at predetermined intervals (for example, 1 second), and the uplink transmission controller transmits the uplink bandwidth ratio information at the predetermined intervals, based on the uplink bandwidth ratio calculated at the predetermined intervals by the uplink bandwidth ratio calculator.

A third characteristic of the present invention is summarized as the radio communication terminal according to the first characteristic, wherein the uplink transmission controller stops transmission of the uplink bandwidth ratio information, when the uplink transmission controller determines that the first radio IP network can provide a bandwidth required to receive the IP packets between completion of the monitoring period and completion of the next monitoring period, based on the received number within the monitoring period and the uplink bandwidth ratio.

A fourth characteristic of the present invention is summarized as the radio communication terminal according to the first characteristic, further comprising: an information receiver (communication interface unit 101 and main controller 111) configured to receive downlink bandwidth ratio information (complementary bandwidth amount notification message) from the radio communication apparatus, the downlink bandwidth ratio information allowing a downlink bandwidth ratio to be recognized, the downlink bandwidth ratio indicating a ratio of the bandwidth of the first radio IP network to be used for transmitting the IP packets, to the bandwidth of the second radio IP network to be used for transmitting the IP packets; a virtual address acquisition unit (main controller 111 and storage unit 113) configured to acquire a virtual address (home IP address AH) of the radio communication apparatus associated with the first and second care-of IP addresses; and a downlink transmitter (transmission packet sorting processor 109) configured to transmit, to the first radio IP network, an IP packet received from the communication destination and includes the virtual address, after adding the first care-of IP address to the IP packet, or to transmit, to the second radio IP network, an IP packet received from the communication destination and includes the virtual address, after adding the second care-of IP address to the IP packet, based on the downlink bandwidth ratio information received by the information receiver.

A fifth characteristic of the present invention is summarized as a radio communication apparatus (MN 300) for performing communication with a communication destination (IP telephone terminal 42) through a communication control apparatus (switching server 100) by using a first radio IP network (radio IP network 10A) which dynamically assigns a first care-of IP address (care-of IP address A1) according to a position of the radio communication apparatus, and a second radio IP network (radio IP network 10B) which assigns a second care-of IP address (care-of IP address A2), the radio communication apparatus comprising: a receiver (radio so communication card 301) configured to receive IP packets transmitted at predetermined intervals (for example, 20 ms) from the communication destination via the first radio IP network; a downlink bandwidth ratio calculator (bandwidth calculator 307) configured to calculate a downlink bandwidth ratio (bandwidth ratio Ri) based on a received number of the IP packets received by the receiver from the communication control apparatus within a monitoring period (window T2), the downlink bandwidth ratio indicating a ratio of a bandwidth of the first radio IP network to a bandwidth of the second radio IP network, the bandwidths of the first and second radio IP networks being to be used for receiving the IP packets between completion of the monitoring period and completion of a next monitoring period (window T3); and a downlink transmission controller (main controller 311) configured to transmit, to the communication control apparatus, downlink bandwidth ratio information (complementary bandwidth amount notification message) from which the downlink bandwidth ratio calculated by the downlink bandwidth ratio calculator, is recognizable.

A sixth characteristic of the present invention is summarized as the radio communication terminal according to the fifth characteristic, wherein the downlink bandwidth ratio calculator calculates the downlink bandwidth ratio at predetermined intervals (for example, 1 second), and the downlink transmission controller transmits the downlink bandwidth ratio information at the predetermined intervals, based on the downlink bandwidth ratio calculated at the predetermined intervals by the downlink bandwidth ratio calculator.

A seventh characteristic of the present invention is summarized as the radio communication terminal according to the fifth characteristic, wherein the downlink transmission controller stops transmission of the downlink bandwidth ratio information, when the downlink transmission controller determines that the first radio IP network can provide a bandwidth required to receive the IP packets between completion of the monitoring period and completion of the neat monitoring period, based on the received number within the monitoring period and the downlink bandwidth ratio.

A eighth characteristic of the present invention is summarized as the radio communication terminal according to the fifth characteristic, further comprising: an information receiver (radio communication card 303 and main controller 311) configured to receive uplink bandwidth ratio information (complementary bandwidth amount notification message) from the communication control apparatus, the uplink bandwidth ratio information allowing an uplink bandwidth ratio (bandwidth ratio Ri) to be recognized, the uplink bandwidth ratio indicating a ratio of the bandwidth of the first radio IP network to be used for transmitting the IP packets, to the bandwidth of the second radio IP network to be used for transmitting the IP packets; a virtual address storage unit (storage unit 313) configured to store a virtual address (home IP address AH) of the radio communication apparatus associated with the first and second care-of IP addresses; and an uplink transmitter (transmission packet sorting processor 309) configured to transmit an IP packet including the virtual address and the first care-of IP so address to the first radio IP network, or to transmit an IP packet including the virtual address and the second care-of IP address to the second radio IP network, based on the uplink bandwidth ratio intonation received by the information receiver.

A ninth characteristic of the present invention is summarized as a communication control method for controlling a communication path for a radio communication apparatus by using a first radio IP network which dynamically assigns a first care-of IP address to the radio communication apparatus according to a position of the radio communication apparatus, and a second radio IP network which assigns a second care-of IP address to the radio communication apparatus, the communication control method comprising the steps of: receiving IP packets transmitted at predetermined intervals from the radio communication apparatus to a communication destination via the first radio IP network, and relaying the received IP packets to the communication destination; calculating an uplink bandwidth ratio based on a received number of the IP packets received from the radio communication apparatus within a monitoring period in the step of relaying, the uplink bandwidth radio indicating a ratio of a bandwidth of the first radio IP network to a bandwidth of the second radio IP network, the bandwidths of the first and second radio IP networks being to be used for receiving the IP packets between completion of the monitoring period end completion of a next monitoring period; and transmitting, to the radio communication apparatus, bandwidth ratio information from which the uplink bandwidth ratio calculated in the step of calculating the uplink bandwidth ratio is recognizable.

A tenth characteristic of the present invention is summarized as a radio communication method for performing communication with a communication destination through a communication control apparatus by using a first radio IP network which dynamically assigns a first care-of IP address to the radio communication apparatus according to a position of the radio communication apparatus, and a second radio IP network which assigns a second care-of IP address to the radio communication apparatus, the radio communication method comprising the steps of: receiving IP packets transmitted at predetermined intervals from the communication destination via the first radio IP network; calculating a downlink bandwidth ratio based on the received number of the IP packets received from the communication control apparatus within a monitoring period in the step of receiving, the downlink bandwidth ratio indicating a ratio of a bandwidth of the first radio IP network to a bandwidth of the second radio IP network, the bandwidths of the first and second radio IP networks being to be used for receiving the IP packets between completion of the monitoring period and completion of a next monitoring period; and transmitting, to the communication control apparatus, downlink bandwidth ratio information from which the downlink bandwidth ratio calculated in the step of calculating the downlink bandwidth ratio is recognizable.

The characteristics of the present invention can provide a communication control apparatus, a radio communication apparatus, a communication control method and a radio communication method, which are capable of complementing an insufficient bandwidth by using another radio IP network, in a case where a radio IP network in use for ongoing communication runs short of a bandwidth while using multiple radio IP networks simultaneously.

BEST MODE FOR CARRYING OUT THE INVENTION

Figure 1:
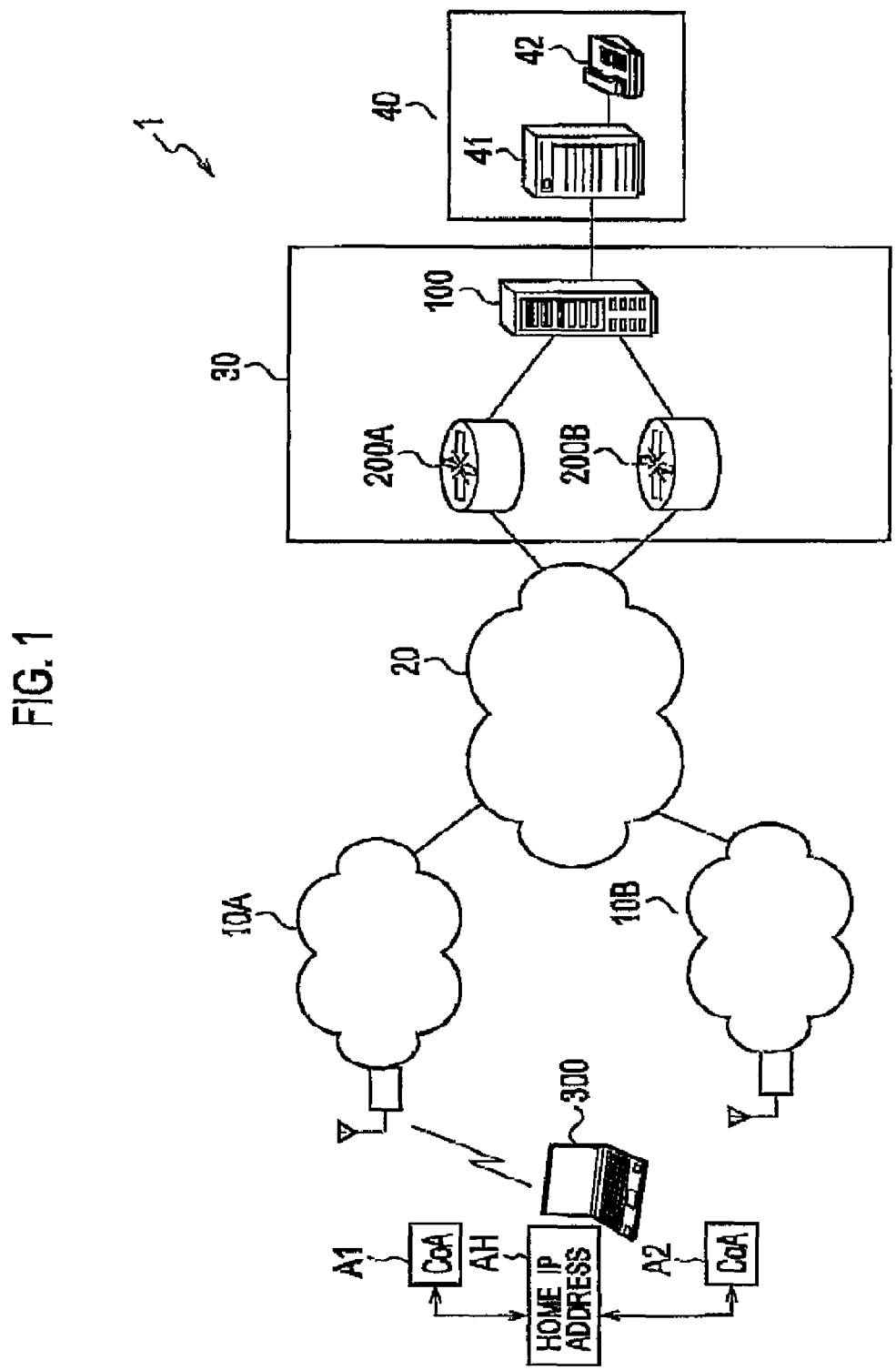
FIG. 1 is an overall schematic configuration diagram of a communication system according to an embodiment of the present invention.

Next, embodiments of the present invention will be described. Note that, in the following description of the drawings, the same or similar parts will be denoted by the same or similar reference numerals. However, it should be noted that the drawings are schematic and ratios of dimensions and the like are different from actual ones.

Therefore, specific dimensions and the like should be determined by taking into consideration the following description. Moreover, as a matter of course, also among the drawings, there are included portions in which dimensional relationships and ratios are different from each other.

(Overall Schematic Configuration of Communication System)

FIG. 1 is an overall schematic configuration diagram of a communication system 1 according to thin embodiment. As shown in FIG. 1, a communication system 1 includes a radio IP network 10A, and a radio IP network 10B. The radio IP network 10A (first radio IP network) is an IP network capable of transmitting IP packets. The radio IP network 10A dynamically assigns a care-of IP address A1 (first care-of IP address) to a radio communication apparatus 300 (hereinafter abbreviated as the MN 300) according to a position of the MN 300. In this embodiment, the radio IP network 10A is a cellular phone network using CDMA (specifically, HRPD as the 3GPP2 standard) as a radio communication system.

The radio IP network 10B (second radio IP network) can transmit IP packets as in the case of the radio IP network 10A. The radio IP network 10B assigns a care-of IF address A2 (second care-of IP address) to the MN 300.

In this embodiment, the radio IP network 10B uses mobile WiMAX conforming to the IEEE802.16e standard as a radio communication system.

Note that the care-of IP address A1 is provided by the radio IP network 10A when the MN 300 is connected to the radio IP network 10A. Similarly, the care-of IP address A2 is provided by the radio IP network 10B when the MN 300 is connected to the radio IP network 10B.

Moreover, in this embodiment, the care-of IP addresses A1 and A2 are associated with a home IP address AH (virtual address).

A switching server 100 and the MN 300 can perform communication by simultaneously using the radio IP networks 10A and 10B. Specifically, when a bandwidth (transfer rate) of the radio IP network 10A used for transmitting and receiving IP packets is insufficient, the switching server 100 and the MN 300 complement the insufficient bandwidth by using the radio IP network 10B.

The radio IP networks 10A and 10B are connected to the Internet 20. Moreover, a relay center 30 is connected to the Internet 20.

In the relay center 30, network devices configured to relay IP packets transmitted and received by the MN 300 are installed. Specifically, in the relay center 30, the switching server 100 and VPN routers 200A and 200B are installed.

The switching server 100 controls a communication path with the MN 300. In this embodiment, the switching server 100 constitutes a communication control apparatus. Specifically, the switching server 100 can transmit an IP packet to the MN 300 via the radio IP network 10A or the radio IP network 10B.

The VPN routers 200A and 200E execute an IP packet routing process. Moreover, the VPN routers 200A and 200B establish a VPN (IPSec) tunnel between the MN 300 and the switching server 100. By establishing the tunnel, an OSI third layer is virtualized to secure IP mobility of the MN 300.

Specifically, in this embodiment, unlike the mobile IP (for example, RFC2002), the MN 300 can execute communication with a communication destination (specifically, an IP telephone terminal 42) while simultaneously using both a communication path set via the radio IP network 10A and a communication path set via the radio IP network 10B.

The relay center 30 (the switching server 100) is connected to a user premise 40 via a predetermined communication network (not shown). In the user premise 40, an IP telephone exchange 41 and the IP telephone terminal 42 are installed. The IP telephone exchange 41 relays IP packets (specifically, VoIP packets) between the predetermined communication network and the IP telephone terminal 42. The IP telephone terminal 42 converts a voice signal and the VoIP packet into each other, and also transmits and receives the IP packets.

Thus, in this embodiment, the MN 300 executes communication with the IP telephone terminal 42 (communication destination) through the switching server 100.

(Functional Block Configuration of Communication System)

Next, a functional block configuration of the communication system 1 will be described. Specifically, functional block configurations of the switching server 100 and the MN 300 which are included in the communication system 1 will be described. Note that portions related to the present invention will be mainly described below. Therefore, it should be noted that the switching server 100 and the MN 300 may include logical blocks (a power source unit and the like) which are not shown or described herein, the logical blocks being essential to implementing functions of the apparatus.

(1) Switching Server 100

Figure 2:
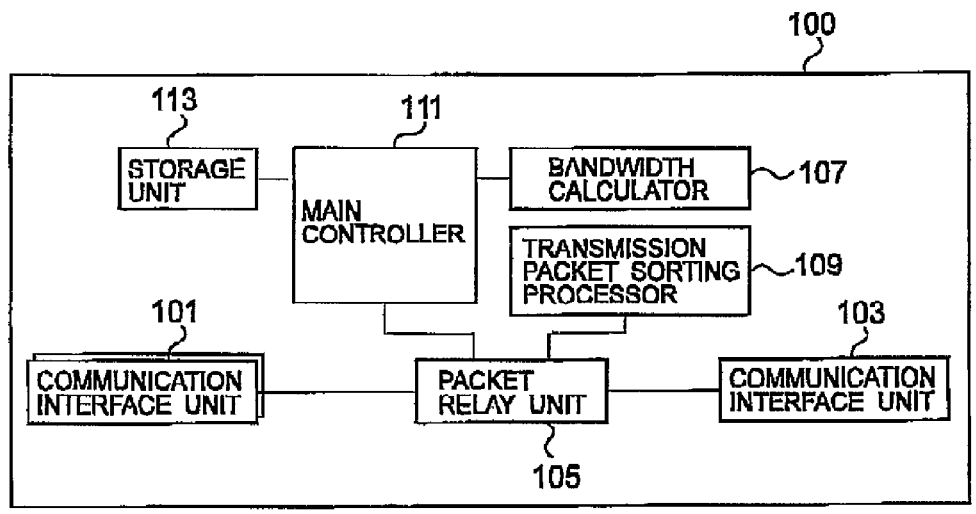
FIG. 2 is a functional block configuration diagram of a communication control apparatus according to the embodiment of the present invention.

FIG. 2 is a functional block configuration diagram of the switching server 100. As shown in FIG. 2, the switching server 100 includes a communication interface unit 101, a communication interface unit 103, a packet relay unit 105, a bandwidth calculator 107, a transmission packet sorting processor 109, a main controller 111 and a storage unit 113.

The communication interface unit 101 is connected to the VPN routers 200A and 200B. The communication interface unit 101 can be configured based on 1000BASE-T specified in IEEE802.3ab, for example.

Figure 5:
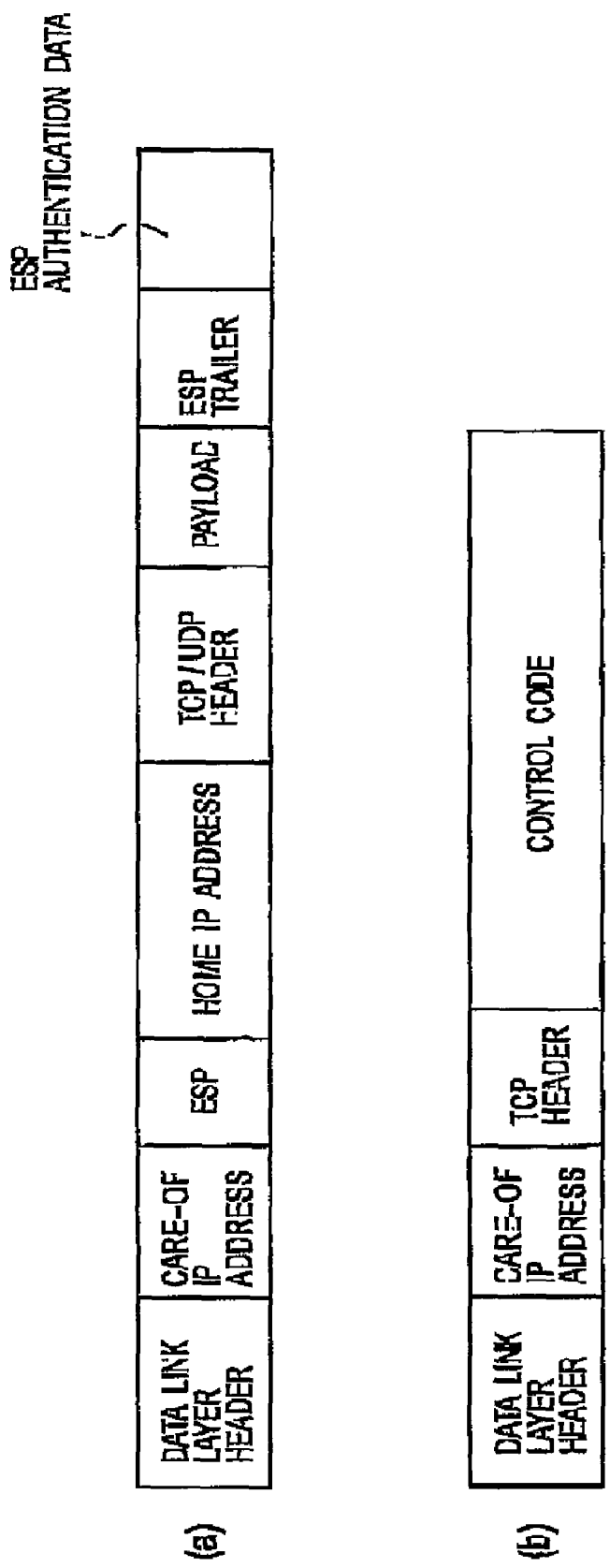
FIG. 5 is a configuration diagram of IP packets according to the embodiment of the present invention.

Moreover, as described above, in this embodiment, since the IPSec VPN is set, each of IP packets transmitted and received by the communication interface unit 101, more specifically, VoIP packets transmitted and received between the switching server 100 and the MN 300 (to be more specific, VoIP packets transmitted by the MN 300) has a configuration shown in FIG. 5 (*a*). As shown in FIG. 5 (*a*), a home IP header (the home IP address AH), a TCP/UDP header and a payload are encapsulated, and a care-of IP address (the care-of IP address A1 or the care-of IP address A2) is added thereto.

Note that each of access control packets transmitted and received between the switching server 100 and the MN 300 has a configuration shown FIG. 5 (*b*). The access control packet includes a data link layer header, a care-of IP address, a TCP header and a control code. Note that the control code will be described in detail later.

The communication interface unit 103 is used to execute communication with the IP telephone exchange 41 and the IP telephone terminal 42.

The packet relay unit 105 relays IP packets transmitted and received by the communication interface unit 101 and the communication interface unit 103. Specifically, the packet relay unit 105 relays the IP packets according to an instruction from the transmission packet sorting processor 109 or the main controller 111. Moreover, the packet relay unit 105 has a jitter buffer configured to absorb jitters of the IF packets received by the communication interface unit 101 and the communication interface unit 103.

Note that, in this embodiment, the packet relay unit 105 constitutes a relay unit configured to receive IP packets (VoIP packets) transmitted at predetermined intervals (20 ms) tram the MN 300 to the IP telephone terminal 42 via the radio IP networks 10A and 10B and to relay the IP packets to the IP telephone terminal 42.

The bandwidth calculator 107 calculates bandwidths (transfer rates) of the radio IP networks 10A and 10B, which are required to receive IP packets from the MN 300. Specifically, the bandwidth calculator 107 calculates a bandwidth ratio Ri (uplink bandwidth ratio) based on the number (received number) of IP packets received from the MN 300 within a window T2 (see FIG. 6) by the packet relay unit 105. In this embodiment, the bandwidth calculator 107 constitutes an uplink bandwidth ratio calculator.

The bandwidth calculator 107 calculates the bandwidth ratio Ri indicating a ratio of the bandwidth of the radio IP network 10A to the bandwidth of the radio IP network 10B. Here, the radio IP network 10A is used for receiving IF packets from the MN 300 within a second-half time frame following a first-half time frame (the window T2) more specifically, within a window T3 (see FIG. 6). The radio IP network 10B is used for receiving IP packets from the MN 300 within the second-half time frame.

Note that, in this embodiment, the window T2 constitutes a monitoring period. Moreover, the window T3 is a period between completion of the window T2 and completion of the next window T2

The bandwidth calculator 107 calculates the bandwidth ratio Ri at predetermined intervals (for example, 1 second) and outputs the calculated bandwidth ratio Ri to the main controller 111.

Note that the bandwidth calculator 107 calculates bandwidths required according to a type of voice coder/decoder (CODEC) and a coding rate and thus can calculate the bandwidth ratio Ri based on the calculated bandwidths. Moreover, a specific calculation example of the bandwidth ratio Ri will be described later.

The transmission packet sorting processor 109 executes a process of sorting the IP packets transmitted from the communication interface unit 101 through the packet relay unit 105 into the radio IP network 10A or the radio IP network 10B.

Specifically, the transmission packet sorting processor 109 adds the care-of IP address A1 to the IP packet including the home IP address AH received from the IP telephone terminal 42 based on a complementary bandwidth amount notification message (downlink bandwidth ratio information) received from the MN 300 by the main controller 111. The IP packet having the care-of IP address A1 added thereto is transmitted from the communication interface unit 101 to the radio IP network 10A.

Moreover, the transmission packet sorting processor 109 adds the care-of IP address A2 to the IP packet including the home IP address AH received from the IP telephone terminal 42 based on the complementary bandwidth amount notification message (downlink bandwidth ratio information) received from the MN 300 by the main controller 111. The IP packet having the care-of IP address A2 added thereto is transmitted from the communication interface unit 101 to the radio IP network 10B.

In this embodiment, the transmission packet sorting processor 109 constitutes a downlink transmitter.

The main controller 111 controls a communication path of the IP packets transmitted to and received from the MN 300. Moreover, the main controller 111 executes processing of the access control packets.

Specifically, the main controller 111 sends the MN 300 uplink bandwidth ratio information, more specifically, complementary bandwidth amount notification message from which the bandwidth ratio Ri (uplink bandwidth ratio) calculated by the bandwidth calculator 107 is recognizable. In this embodiment, the main controller 111 constitutes an uplink transmission controller.

In this embodiment, the main controller 111 transmits the complementary bandwidth amount notification message at the predetermined intervals (1 second) based on the bandwidth ratio Ri calculated at the predetermined intervals (1 second) by the bandwidth calculator 107.

Moreover, the main controller 111 receives from the MN 300 the complementary bandwidth amount notification message (downlink bandwidth ratio information) from which a bandwidth ratio Ri (downlink bandwidth ratio) indicating a ratio of the bandwidth of the radio IP network 10A to the bandwidth of the radio IP network 10B is recognizable. Here, the radio IP network 10A is used for transmitting IP packets to the MN 300, and the radio IP network 10B is used for transmitting IP packets to the MN 300. In this embodiment, the communication interface unit 101 and the main controller 111 constitute an information receiver.

The main controller 111 controls the transmission packet sorting processor 109 to sort the IP packets to be transmitted to the MN 300 into the radio IP network 10A or the radio IP network 10B, based on the complementary bandwidth amount notification message received from the MN 300.

The complementary bandwidth amount notification message described above is transmitted and received by using the access control packet (see FIG. 5 (*b*)). Table 1 shows an example of contents of the access control packet transmitted from the MN 300 to the switching server 100. Moreover, Table 2 shows an example of contents of the access control packet transmitted from the switching server 100 to the MN 300.

of the access control packet received from the MN 300 is copied onto the access control packet transmitted from the switching server 100.

Moreover, the main controller 111 checks an older of the IP packets received via the radio IP networks 10A and 10B. In this embodiment, the main controller 111 checks a sequence number of a RTP (real-time transport protocol) included in the VoIP packet transmitted and received between the MN 300 and the IP telephone terminal 42. Furthermore, the main controller 111 can acquire statistic information (for example, a packet loss, a throughput and an underrun count and an overrun count of the jitter buffer) on the IP packet relayed by the packet relay unit 105, and transmit the acquired information to the MN 300.

The storage unit 113 stores application programs providing functions or the switching server 100, and the like. Moreover, the storage unit 113 stores information on the networks such as the radio IP networks 10A and 10B.

Particularly, in this embodiment, the storage unit 113 stores the home IP address AH of the MN 300 associated with the care-of IP addresses A1 and A2. Specifically, the main controller 111 allows the storage unit 113 to store the care-of IP address A1, the care-of IP address A2 and the home IP address AH, which are notified from the MN 300. In this embodiment, the main controller 111 and the storage unit 113 constitute a virtual address acquisition unit.

TABLE 1

ACCESS CONTROL PACKET (FROM MN 300 TO SWITCHING SERVER 100)

| TYPE | CONTROL CODE | NAME | PROCESS CONTENTS |
|---|---|---|---|
| COMMUNICATION INTERFACE CHANGE | 0x11 | INTERFACE SWITCH REQUEST | SWITCH TO COMMUNICATION INTERFACE THAT HAS RECEIVED THIS MESSAGE AND ALSO CONTINUE COMMUNICATION AT THE ORIGINAL COMMUNICATION INTERFACE UNTIL INSTRUCTION IS GIVEN, RESPOND TO MN WITH CONTROL CODE 0X12. |
| BANDWIDTH RATIO NOTIFICATION | 0x22 | COMPLEMENTARY BANDWIDTH AMOUNT NOTIFICATION MESSAGE | NOTIFY SWITCHING SERVER OF BANDWIDTH RATIO (DOWNLINK) |
| REPLY REQUEST | 0x31 | COPY REPLY REQUEST | DIRECTLY REPLY RECEIVED PAYLOAD WITH CONTROL CODE 0x32 |
| RESPONSE | 0x2c | COMPLEMENTARY BANDWIDTH AMOUNT NOTIFICATICN RESPONSE | RESPOND WITH CONTROL CODE 0x28 TO COMPLEMENTARY BANDWIDTH AMOUNT NOTIFICATION |

TABLE 2

ACCESS CONTROL PACKET (FROM SWITCHING SERVER 100 TO MN 300)

| TYPE | CONTROL CODE | NAME | PROCESS CONTENTS |
|---|---|---|---|
| RESPONSE | 0x12 | INTERFACE CHANGE RESPONSE | RESPOND TO CONTROL CODE 0x11 |
| | 0x24 | COMPLEMENTARY BANDWIDTH AMOUNT NOTIFICATION RESPONSE | RESPOND TO CONTROL CODE 0x22 |
| | 0x32 | COPY RESPONSE | RESPOND TO CONTROL CODE 0x31 |
| BANDWIDTH RATIO NOTIFICATION | 0x23 | COMPLEMENTARY BANDWIDTH AMOUNT NOTIFICATION MESSAGE | NOTIFY MN OF BANDWIDTH RATIO (UPLINK) |

Note that each of the control codes is expressed by use of 1 byte of a leading end of the payload portion (see FIG. 5 (*b*)) or the access control packet. Furthermore, the home IP address AH of the MN 300 may be included so as to follow the control code. Upon receipt of the access control packet having the contents shown in Table 1 from the MST 300, the switching server 100 transmits the access control packet (response packet) shown in Table 2 to the MN 300. The payload portion Note that the main controller 111 can check the home IP address AH included is the IP packet transmitted from the IP telephone terminal 42 against a home IP address registered, with a home agent (not shown) accessible through the Internet 20. The above check performed by the main controller 111 makes it possible to determine by which one of carriers the home IP address AH is assigned to the MN 300.

(2) MN 300

Figure 3:
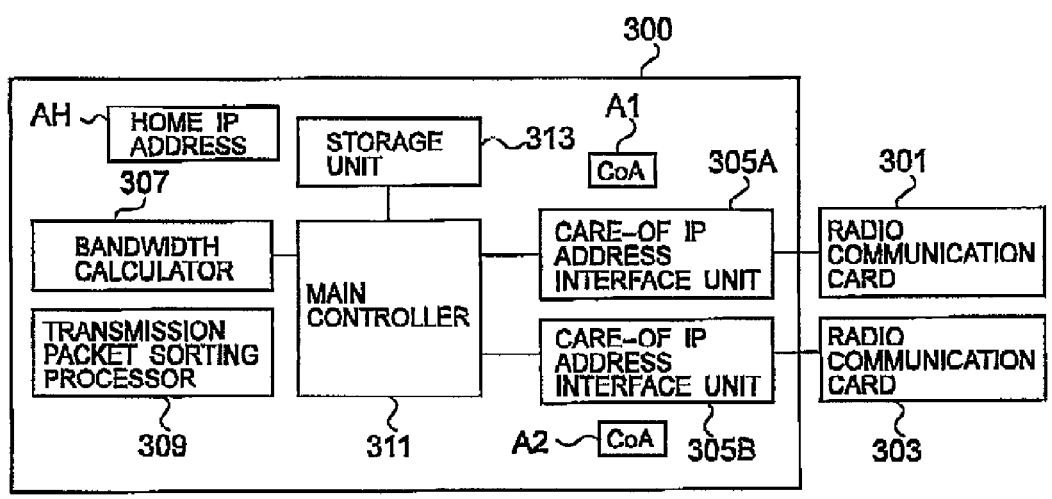
FIG. 3 is a functional block configuration diagram of a radio communication apparatus according to the embodiment of the present invention.

FIG. 3 is a functional block configuration diagram of the MN 300. As in the case of the switching server 100, the MN 300 can perform communication by simultaneously using the radio IP networks 10A and 10B. Hereinafter, as to the same functional blocks as those of the switching server 100 described above, description thereof will be appropriately omitted.

As shown in FIG. 3, the MN 300 includes a radio communication card 301, a radio communication card 303, a care-of IP address interface unit 305A, a care-of IP address interface unit 305B, a bandwidth calculator 307, a transmission packet sorting processor 309, a main controller 311 and a storage unit 313.

The radio communication card 301 performs radio so communication of the radio communication system (HRPD as the 3GPP2 standard) used in the radio IP network 10A. In this embodiment, the radio communication card 301 constitutes a receiver configured to receive IP packets (VoIP packets) transmitted at predetermined intervals (for example, 20 ms) from the IP telephone terminal 42 via the radio IP network 10A.

The radio communication card 303 performs radio communication conforming to the radio communication system (mobile WiMAX) used in the radio IP network 10B.

The care-of IP address interface unit 305A is connected to the radio communication card 301. The care-of IP address interface unit 305A transmits and receives IP packets based on a care-of IP address A1 assigned to the MN 300 in the radio IP network 10A.

The care-of IP address interface unit 305B is connected to the radio communication card 303. The care-of IP address interface unit 305B transmits and receives IP packets based on a care-of IP address A2 assigned to the MN 300 in the radio IP network 105.

The bandwidth calculator 307 calculates bandwidths (transfer rates) of the radio IP networks 10A and 10B, which are required to receive IP packets from the switching server 100.

Specifically, the bandwidth calculator 307 calculates a bandwidth ratio Ri (downlink bandwidth ratio) based on the number (received number) of IP packets received from the switching server 100 within the window T2 by the radio communication card 301. In this embodiment, the bandwidth calculator 307 constitutes a downlink bandwidth ratio calculator.

The bandwidth calculator 307 calculates the bandwidth ratio Ri indicating a ratio of the bandwidth of the radio IP network 10A to the bandwidth of the radio IP network 108. Here, the radio IP network 10A is used for receiving IP packets from the switching server 100 within the window T3, and the radio IP network 10B is used for receiving IP packets from the switching server 100 within the second-half time frame.

The bandwidth calculator 307 calculates the bandwidth ratio Ri at predetermined intervals (for example, 1 second) and outputs the calculated bandwidth ratio Ri to the main controller 311.

The transmission packet sorting processor 309 executes a process of sorting the IP packets into the radio IP network 10A or the radio IP network 10B based on a complementary bandwidth amount notification message (uplink bandwidth ratio information) received from the switching server 100 by the main controller 311.

In this embodiment, the transmission packet sorting processor 309 constitutes an uplink transmitter.

Specifically, the transmission packet sorting processor 309 can transmit the IP packet including the home IP address AH and the care-of IP address A1 to the radio IP network 10A based on the received complementary bandwidth amount notification message. Moreover, the transmission packet sorting processor 309 can transmit the IP packet including the home IP address AH and the care-of IP address A2 to the radio IP network 10B based on the received complementary bandwidth amount notification message.

As in the case of the main controller 111 (see FIG. 2) in the switching server 100, the main controller 311 controls a communication path of the IP packets transmitted to and received from the switching server 100. Moreover, the main controller 311 executes processing at the access control packets.

Specifically, the main controller 311 sends the switching server 100 a complementary bandwidth amount notification message (downlink bandwidth ratio information) from which the bandwidth ratio Ri (downlink bandwidth ratio) calculated by the bandwidth calculator 307 is recognizable. In this embodiment, the main controller 311 constitutes a downlink transmission controller.

In this embodiment, the main controller 311 transmits the complementary bandwidth amount notification message at the predetermined intervals (1 second) based on the bandwidth ratio Ri calculated at the predetermined intervals (1 second) by the bandwidth calculator 307.

Moreover, the main controller 311 receives from the switching server 100 the complementary bandwidth amount notification message (uplink bandwidth ratio information) from which a bandwidth ratio Ri (uplink bandwidth ratio) is recognizable, the bandwidth ratio Ri indicating a ratio of the bandwidth of the radio IP network 10A to the bandwidth of the radio IP network 10B. Here, the radio IP network 10A is used for transmitting IP packets to the switching server 100, and the radio IP network 10B used for transmitting IP packets to the switching server 100. In this embodiment, the radio communication card 301 and/or the radio communication card 303 and the main controller 311 constitute an information receiver.

The main controller 311 controls the transmission packet sorting processor 309 to sort the IP packets to be transmitted to the switching server 100 into the radio IP network 10A or the radio IP network 10B, based on the complementary bandwidth amount notification massage received from the switching server 100.

The storage unit 313 stores application programs providing functions of the MN 300, and the like. Moreover, the storage unit 313 stores the home IP address AH of the MN 300 associated with in the care-of IP addresses A1 and A2. In this embodiment, the storage unit 313 constitutes a virtual address storage unit.

(Operations of Communication System)

Next, operations of the communication system will be described. Specifically, description will be given of (1) transmission and reception of IP packets (VoIP packets) between the switching server 100 and the MN 300, (2) determination of whether or not a bandwidth is required to be complemented by the radio IP network 10B, (3) sorting of the IP packets (VoIP packets) into the radio IP networks 10A and 10B, and (4) an operation example.

(1) Transmission and Reception of IP Packets Between Switching Server 100 and MN 300

Figure 4:
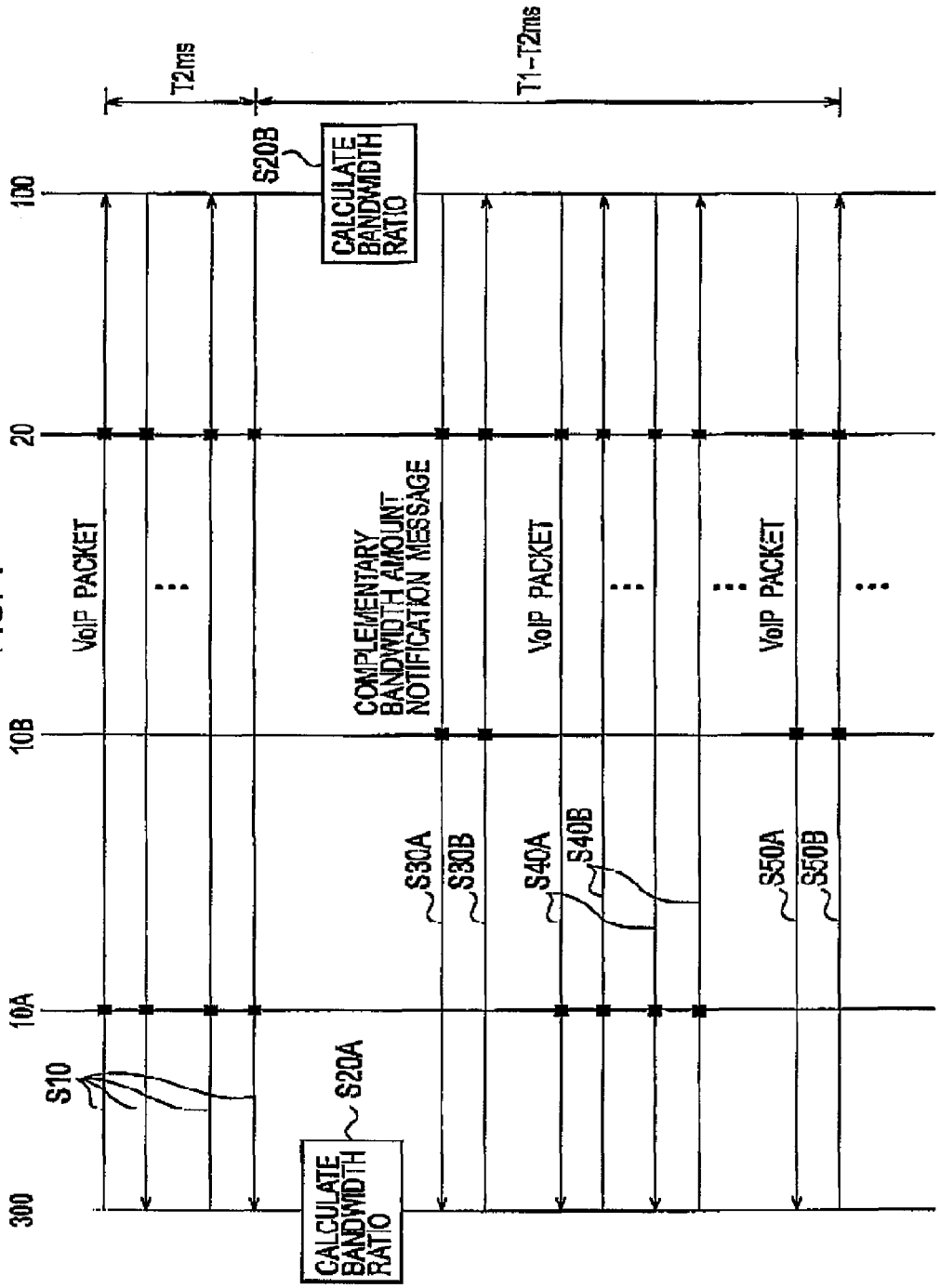
FIG. 4 is a sequence diagram of communication performed between the communication control apparatus and the radio communication apparatus according to the embodiment of the present invention.

FIG. 4 is a sequence diagram of communication performed between the switching server 100 and the MN 300. As shown in FIG. 4, in Step S10, the switching server 100 and the MN 300 transmit and receive VoIP packets. Note that the VoIP packets are transmitted and received during a voice call between the MN 300 and the IP telephone terminal 42 (see FIG. 1).

Specifically, the MN 300 transmits an IP packet (see FIG. 5 (*a*)) having a payload and a home IP address AH encapsulated and having a care-of IP address A1 as a transmission source address, the payload including an IP address assigned to the IP telephone terminal 42.

Moreover, the switching server 100 transmits an IP packet having a VoIP packet encapsulated and having the care-of IP address A1 as a destination address, the VoIP packet being transmitted from the IP telephone terminal 42.

Note that the narks "■" in FIG. 4 are set on the networks through which the VoIP packets pass (the same shall apply hereinafter). In Step S10, all the VoIP packets pass through the radio IP network 10A and the Internet 20.

In Step S20A, the MN 300 calculates a "downlink" bandwidth ratio Ri to be received by using the radio IP networks 10A and 10B. Moreover, in Step S20B, the switching server 100 calculates an "uplink" bandwidth ratio Ri be received by using the radio IP networks 10A and 10B. In Steps S20A and S20B, the bandwidth ratios Ri are calculated based on the number (received number) of VoIP packets received within the window T2 (sec FIG. 6). Note that a specific method for calculating the bandwidth ratios Ri will be described later.

In Step S30A, the switching server 100 sends the MN 300 a complementary bandwidth amount notification message (uplink bandwidth ratio information), based on the calculation result of the "uplink" bandwidth ratio Ri.

In Step S30B, the MN 300 sends the switching server 100 a complementary bandwidth amount notification message (downlink bandwidth ratio information), based on the calculation result of the "downlink" bandwidth ratio Ri.

In Step S40A, the switching server 100 sends the radio IP network 10A the number of VoIP packets that can be transmitted within the window T3 (see FIG. 6), based on the complementary bandwidth amount notification message (downlink bandwidth ratio information) received from the MN 300.

In Step S40B, the MN 300 solids the radio IP network 10A the number of VoIP packets that can be transmitted within the window T3, based on the complementary bandwidth amount notification message (uplink bandwidth ratio information) received from the switching server 100.

In Step S50A, the switching server 100 sends the radio IP network 10B the remaining number of VoIP packets excluding the number of VoIP packets transmitted to the radio IP network 10A within the window T3, based on the complementary bandwidth amount notification message (downlink bandwidth ratio information) received from the MN 300.

In Step S50B, the MN 300 sends the radio IP network 10B the remaining number of VoIP packets excluding the number of VoIP packets transmitted to the radio IP network 10A within the window T3, based on the complementary bandwidth amount notification message (uplink bandwidth ratio information) received from the switching server 100.

In Steps S50A and S50B, the VoIP packets pass through the radio IP network 10B and the Internet 20 (see the marks ■ in FIG. 4). Specifically, the radio IP network 10B complements a bandwidth required to transmit the remaining number of VoIP packets excluding the number of VoIP packets that can be transmitted to the radio IP network 10A within the window T3.

Figure 6:
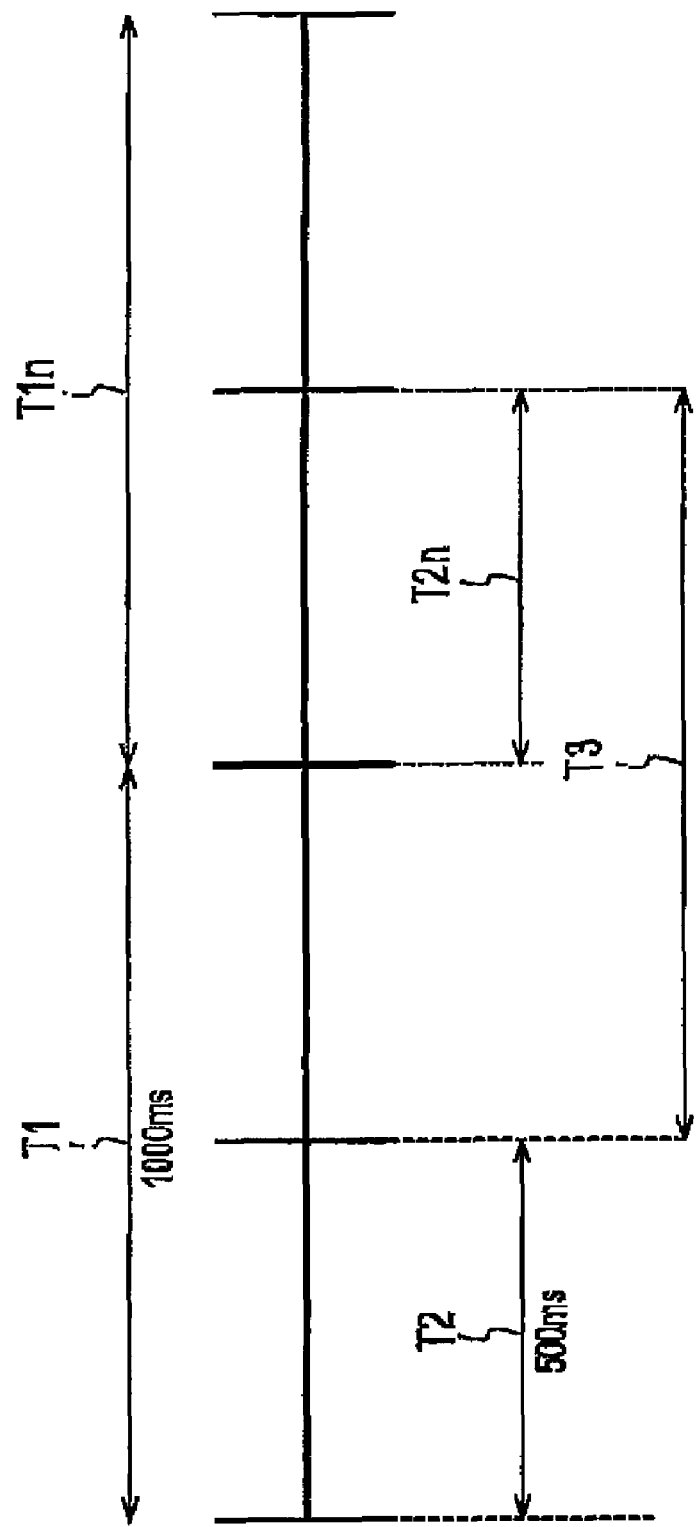
FIG. 6 is a configuration diagram at a window used for determination of a complementary bandwidth according to the embodiment of the present invention.

(2) Determination of Whether or not Bandwidth Complementing by Radio IP Network 10B is Required As described above, the switching server 100 and the MN 300 determine whether or not it is required to complement a bandwidth by using the windows shown in FIG. 6. As shown in FIG. 6, in this embodiment, a window T1 is set to 1 second (1,000 ms) and the window T2 is set to 500 ms that is half the size of the window T1. Specifically, the window T1–the window T2 (second-half time frame) is also equal to 500 ms.

Hereinafter, description will be given of determination of whether or not bandwidth complementing is required in the switching server 100 as an example. Note that the same determination of whether or not bandwidth complementing is required as that in the switching serves 100 is executed in the MN 300.

(2.1) Premise

The switching server 100 counts the VoIP packets received a from the MN 300 within the window T2. In this embodiment, the size of the window T2 is fixed to 500 ms.

An allowable time or the jitter buffer is $t_{jit}$ (for example, 100 ms) A frame length of a real-time application (in this embodiment, VoIP) used is $T_f$ (20 ms). Moreover, the number of the VoIP packets received within the window T2 is Ct.

In the window T2, $T2/T_f$ (500/20-25) VoIP packets can be received. Thus, when Ct (for example, 20) VoIP packets are received at the and of the window T2, it means that VoIP packet transfer is delayed by ($T2/T_f$-Ct).

(2.2) Bandwidth Complementing Process in First Round

The MN 300 has already transmitted $T2/T_f$ (for example, 25) VoIP packets within the window T2, that is, 500 ms. Thus, the switching server 100 determines, at the end or the window T2, whether or not bandwidth complementing is required, based on (Expression 1).

If $Ct=T2/T_f-1$

Then bandwidth complementing is not executed

Else bandwidth complementing is executed

... (Expression 1)

Note that, in (Expression 1), "1" is a tolerance and a proper value is set according to characteristics of the communication system 1, and the like.

When it is determined by (Expression 1) to execute the bandwidth complementing, it means that only a bandwidth equivalent to $Ct/(T2/T_f)$ compared with a required bandwidth can be secured in the radio IP network 10A within the window T2. Therefore, the switching server 100 calculates a bandwidth ratio Ri based on (Expression 2).

A bandwidth ratio Ri of a primary path to a subsidiary path $$-Ct/(T2/T_f):(T2/T_fCt)/(T2/T_f)=Ct:(T2/T_f-Ct) \quad \text{(Expression 2)}$$

Here, the primary path is the radio IP network 10A and the subsidiary path is the radio IP network 10B. Moreover, when a radio communication state of the subsidiary path is not more than a predetermined threshold, bandwidth complementing is not to be executed. Specifically, when a throughput assumed based on receiving electric field intensity of a radio signal transmitted from the subsidiary path, that is, the radio IP network 10B is not more than a predetermined threshold, the switching server 100 does not execute the bandwidth complementing.

The switching server 100 notifies the MN 300 of the bandwidth ratio Ri (truncated after the decimal point) calculated based on (Expression 2), by the complementary bandwidth amount notification message. The MN 300 allows bandwidth complementing to be executed by the radio IP network 10B when the radio communication state of the subsidiary path, that is, the radio IP network 10B used for bandwidth complementing exceeds the predetermined threshold.

(2.3) Bandwidth Complementing Process in Second Round

In a second round following the first round, in other words, a window $T1_n$ (see FIG. 6) after the first round (the window T1), the MN 300 executes bandwidth complementing based on the bandwidth ratio Ri (for example, 1:2) notified to the MN 300 by the complementary bandwidth amount notification message. The switching server 100 continues to count, in the window $T1_n$, the VoIP packets received from the MN 300 within a window $T2_n$ (see FIG. 6).

Here, the bandwidth ratio calculated in the first round is $R_1$. Moreover, the number of VoIP packets received via the primary path within the window T2 in the second round is $C_{tm1}$ and the number of VoIP packets received via the subsidiary path within the window T2 in the second round is $C_{ts1}$.

The switching server 100 calculates a bandwidth ratio $R_2$ in the second round following the first round by using (Expression 3).

If $C_{tm1} < (1-R1)*(T2/T_f) - n$ (default: n=1)
If $C_{ts1} \geq R1*(T2/T_f)m$ (default: m=1)
    Then $R2=((T2/T_f)-C_{tm1})/C_{tm1}$ . . . increase complementary bandwidth amount
Else R2=R1
Else if $C_{ts1} < (R1*(T2/T_f)-m)$
    Then $R2=C_{ts1}/(T2/T_f)$ . . . reduce complementary bandwidth amount
Else R2=R1 . . . (Expression 3)

Note that the switching server 100 similarly uses (Expression 3) to calculate bandwidth ratios Ri in a third round and rounds subsequent thereto.

(3) Sorting of IP Packets

Next, description will be given of a method for sorting IP packets (VoIP packets) into the radio IP networks 10A and 10B. The following description will be given by taking sorting of IP packets in the switching server 100 as an example. Note that IP packets can also be sorted in the MN 300 in the same manner as in the switching server 100.

The switching server 100 uses the radio IP network 10A to transmit the VoIP packets at predetermined intervals (20 ms). Moreover, upon receipt of the complementary bandwidth amount notification message from the MN 300, the switching server 100 sorts the VoIP packets into the radio IP networks 10A and 10B as described below.

The switching server 100 transmits the VoIP packets to the radio IP network 10B at a rate of once in 1/R1, based on the bandwidth ratio R1 (truncated after the decimal point) included in the complementary bandwidth amount notification message received from the MN 300. For example, when R1-3, the switching server 100 transmits the VoIP packets to the subsidiary path (the radio IP network 10B) only once after transmitting the VoIP packets to the primary path (the radio IP network 10A) three times in a row.

Specifically, assuming that a sequence number (or a transmission No.) of the VoIP packet (RTP packet) to be transmitted is N, the switching server 100 sorts the VoIP packets according to (Express on 4).

If R1=0
Then all VoIP packets are transmitted to the primary path
If N (Mod R1)–0
Then VoIP packets ere transmitted to the subsidiary path
Else VoIP packets are transmitted to the primary path
. . . (Expression 4)

Note that the switching server 100 similarly sorts the VoIP packets according to (Expression 4) after the first round.

(4) Operation Example

Figure 7:
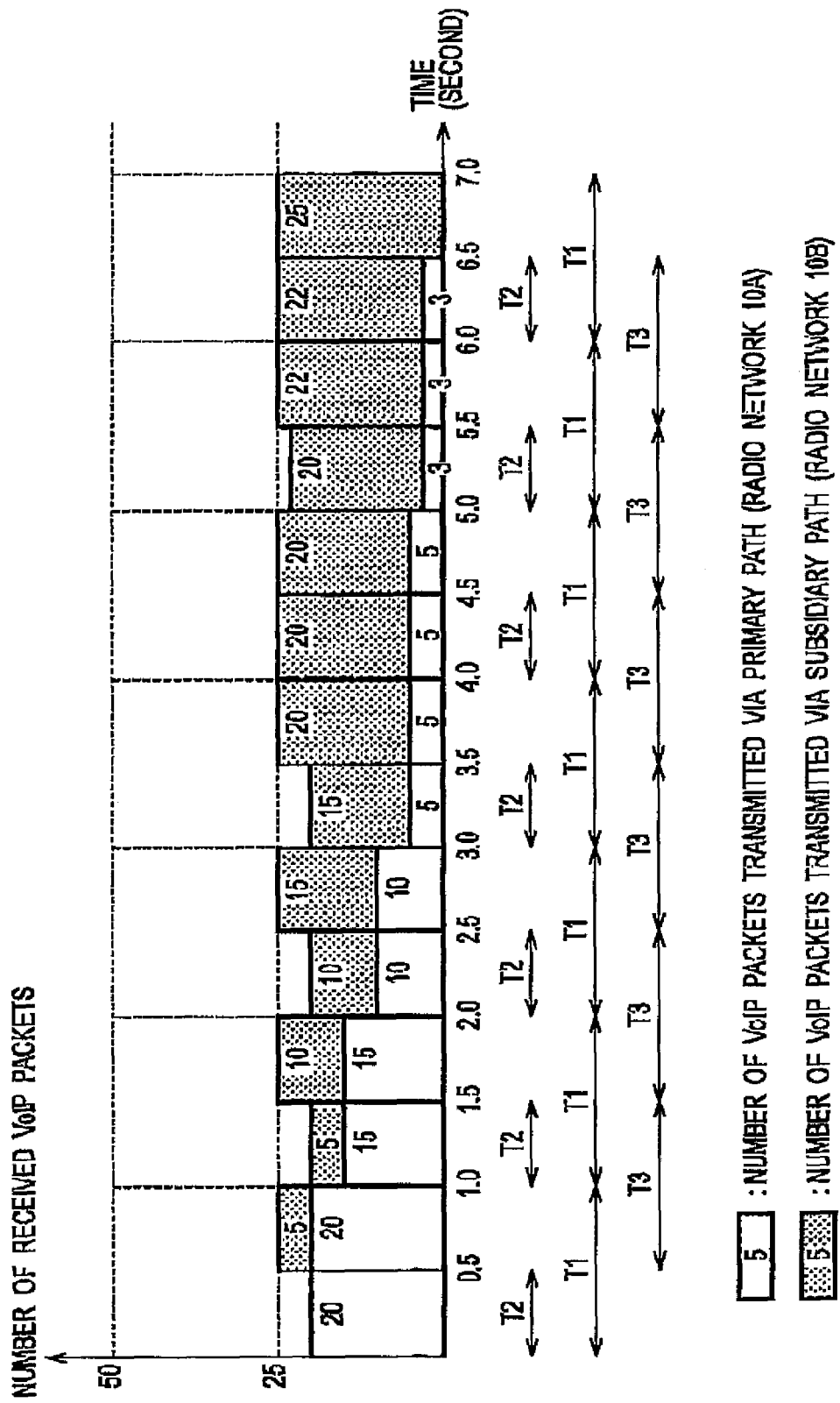
FIG. 7 is a diagram showing an example of a complementary bandwidth by the communication control apparatus according to the embodiment of the present invention.

FIG. 7 shows an operation example of bandwidth complementing by the switching server 100. As shown in FIG. 7, the switching server 100 receives 20 (Ct) VoIP packets via the radio IP network 10A within the window T2 (0 to 0.5 seconds).

Then the switching server 100 executes bandwidth complementing by using the radio IP network 10B based on (Expression 1) and (Expression 2) described above. Specifically, the switching server 100 notifies the MN 300 of the calculated bandwidth ratio Ri (truncated after the decimal point) by the complementary bandwidth amount notification message.

As a result, the switching server 100 receives the VoIP packets from the MN 300 via the radio IP network 10B. Specifically, the switching server 100 receives 5 VoIP packets via the radio IP network 10B in each of windows "0.5 to 1.0 second" and "1.0 to 1.5 seconds" (both combined as the window T3).

The switching server 100 counts the number (Ctm1) of the VoIP packets received via the radio IP network 10A within a next window T2 (1.0 to 1.5 seconds) and the number (Cts1) of the VoIP packets received via the radio IP network 10A within the window.

Note that the MN 300 transmits 25 VoIP packets in 0.5 seconds. Specifically, if the switching server 100 does not receive 25 VoIP packets in 0.5 seconds (for example, 1.0 to 1.5 seconds or 2.0 to 2.5 seconds), it means that the VoIP packets are lost in the radio IP network 10A or the radio IP network 10B.

For example, in the case of 1.0 to 1.5 seconds, the MN 300 transmits 20 VoIP packets to the radio IP network 10A and 5 VoIP packets to the radio IP network 10B, based on the received complementary bandwidth amount notification message. However, the switching server 100 receives only 15 VoIP packets via the radio IP network 10A.

The switching server 100 calculates the bandwidth ratio R2 by using (Expression 3) described above. The switching server 100 determines to increase the complementary bandwidth amount within the window T2 (1.0 to 1.5 seconds). As a result, the switching server 100 receives 10 VoIP packets via the radio IP network 10B in each of windows "1.5 to 2.0 seconds" and "2.0 to 2.5 seconds". Thereafter, the switching server 100 repeats the same process.

(Operations and Effects)

The switching server 100 calculates the bandwidth ratio Ri (uplink bandwidth ratio) based on the received number of IP packets (VoIP packets) received from the MN 300, and sends to the MN 300 the complementary bandwidth amount notification message from which the calculated bandwidth ratio Ri is recognizable. Thus, the MN 300 can sort the IP packets into the radio IP networks 10A and 10B based on the received complementary bandwidth amount notification message.

Specifically, the switching server 100 can simultaneously use the multiple radio IP networks and, when the radio IP network used for ongoing communication runs short of a bandwidth, can complement the insufficient bandwidth by another radio IP network. More specifically, the multiple radio IP networks are not simply switched but can be "seamlessly" used.

Moreover, the care-of IP address A1 assigned to the MN 300 in the radio IP network 10A and the care-of IP address A2 assigned to the MN 300 in the radio IP network 10B are associated with the home IP address AH. Thus, the MN 300 can execute communication by simultaneously using the multiple care-of IP addresses.

Note that, as described above, the switching server 100 executes monitoring of the uplink communication state and sorting of the downlink VoIP packets. Meanwhile, the MN 300 uses the same method as that used by the switching server 100 to execute monitoring of the downlink communication state and sorting of the uplink VoIP packets. Specifically, the communication system 1 including the switching server 100 and the MN 300 is capable of simultaneously using the multiple radio IP networks used in both uplink and downlink communications, thereby, when the radio IP network in use for ongoing communication runs short of a bandwidth, complementing the insufficient bandwidth by using another radio IP network.

In this embodiment, at the predetermined intervals (1 second), the switching server 100 (the MN 300) transmits the complementary bandwidth amount notification message based on the bandwidth ratio Ri calculated at the predetermined intervals (1 second), the message allowing the bandwidth ratio Ri to be recognized. Thus, it is possible to promptly respond to changes in the states of the radio IP networks 10A and 10B and also to sort a proper number of IP packets (VoIP packets) according to the states of the radio IP networks 10A and 10B into the radio IP networks 10A and 10B.

(Other Embodiments)

As described above, the contents of the present invention have been disclosed through one embodiment of the present invention. However, it should be understood that the present invention is not limited to the description and drawings which constitute a part of this disclosure. From this disclosure, various alternative embodiments will become apparent to those skilled in the art.

For example, although the communication system 1 includes the radio IP networks 10A and 10B, the number of radio IP networks to be used may be more than two.

Furthermore, although, in the above embodiment, the insufficient bandwidth is complemented in both uplink and downlink communications, only the uplink or downlink bandwidth may be complemented.

Moreover, the main controller 111 in the switching server 100 may stop transmission of the complementary bandwidth amount notification message when determining, based on the bandwidth ratio Ri and the number (received number) of the IP packets received tram the MN 300 within the window T2 by the packet relay to unit 105, that the bandwidth required to receive the IP packets from the MN 300 within the window T3 can be secured by the radio IP network 10A. Note that, if not receiving the complementary bandwidth amount notification message from which the bandwidth ratio Ri is recognizable, the MN 300 may continue the IP packet sorting process based on the currently set bandwidth ratio Ri.

Similarly, the main controller 311 in the MN 300 may stop transmission of the complementary bandwidth amount notification message when determining, based on the bandwidth ratio Ri and the number (received number) of the IP packets received from the switching server 100 within the window T2 by the radio communication card 301, that the bandwidth required to receive the IP packets within the window T3 (second-half time frame) can be secured by the radio IP network 10A.

According to such modified embodiments, a processing load on the switching server 100 (the MN 300) can be reduced and further efficient utilization of the radio IP networks can be achieved by suppressing transmission of the complementary bandwidth amount notification message to the radio IP network 10B (or the radio IP network 10A).

Although, in the above embodiment, the switching server 100 transmits the complementary bandwidth amount notification message at the predetermined intervals (1 second), the complementary bandwidth amount notification message does not always have to be transmitted at the predetermined intervals.

The complementary bandwidth amount notification message includes the bandwidth ratio Ri in the above embodiment but may include the bandwidth (transfer rate) of the radio IP network or the number of IP packets to be transmitted via the radio IP network, based on the calculated bandwidth ratio Ri.

Moreover, the radio communication card 301 (or the radio communication card 303) described above may be a radio unit included in the radio communication apparatus.

As described above, the present invention includes various embodiments and the like which are not described herein, as a matter of course. Therefore, a technological scope of the present invention is defined only by items specific to the invention according to claims pertinent based on the foregoing description.

Note that the entire contents of Japanese Patent Application No. 2006-322675 (filed on Nov. 29, 2006) are incorporated herein by reference.

INDUSTRIAL APPLICABILITY

Thus, a communication control apparatus, a radio communication apparatus, a communication control method and a radio communication method according to the present invention are useful in radio communication such as mobile communication because the apparatuses and the methods are capable of using multiple radio IP networks simultaneously, thereby, when the radio IP network in use for ongoing communication rune short of a bandwidth, complementing the insufficient bandwidth by using another radio IP network.

The invention claimed is:

1. A communication control apparatus for controlling a communication path for a radio communication apparatus by using a first radio IP network which dynamically assigns a first care-of IP address to the radio communication apparatus according to a position of the radio communication apparatus, and a second radio IP network which assigns a second care-of IP address to the radio communication apparatus, the communication control apparatus comprising:
   a relay configured to receive IP packets transmitted at predetermined intervals from the radio communication apparatus to a communication destination via the first radio IP network and via the second radio IP network, and to relay the received IP packets to the communication destination;
   an uplink bandwidth ratio calculator configured to calculate an uplink bandwidth ratio based on a received number of the IP packets from the first radio IP network and the second radio IP network received by the relay from the radio communication apparatus within a monitoring period,
   the uplink bandwidth ratio indicating a ratio of a bandwidth of the first radio IP network to a bandwidth of the second radio IP network,
   receiving the IP packets between completion of the monitoring period and completion of a next monitoring period based on the bandwidths of the first and second radio IP networks within the monitoring period; and
   an uplink transmission controller configured to transmit, to the radio communication apparatus, uplink bandwidth ratio information from which the uplink bandwidth ratio calculated by the uplink bandwidth ratio calculator is contained within.

2. The communication control apparatus according to claim 1, wherein the uplink bandwidth ratio calculator calculates the uplink bandwidth ratio at predetermined intervals, and
   the uplink transmission controller transmits the uplink bandwidth ratio information at the predetermined intervals, based on the uplink bandwidth ratio calculated at the predetermined intervals by the uplink bandwidth ratio calculator.

3. The communication control apparatus according to claim 1, wherein the uplink transmission controller stops transmission of the uplink bandwidth ratio information, when the uplink transmission controller determines that the first radio IP network can provide a bandwidth required to receive the IP packets between completion of the monitoring period and completion of the next monitoring period, based on the received number within the monitoring period and the uplink bandwidth ratio.

4. The communication control apparatus according to claim 1, further comprising:
an information receiver configured to receive downlink bandwidth ratio information from the radio communication apparatus, the downlink bandwidth ratio information allowing a downlink bandwidth ratio to be recognized, the downlink bandwidth ratio indicating a ratio of the bandwidth of the first radio IP network to be used for transmitting the IP packets, to the bandwidth of the second radio IP network to be used for transmitting the IP packets;
a virtual address acquisition unit configured to acquire a virtual address of the radio communication apparatus associated with the first and second care-of IP addresses; and
a downlink transmitter configured to transmit, to the first radio IP network, an IP packet received from the communication destination and includes the virtual address, after adding the first care-of IP address to the IP packet, or to transmit, to the second radio IP network, an IP packet received from the communication destination and includes the virtual address, after adding the second care-of IP address to the IP packet, based on the downlink bandwidth ratio information received by the information receiver.

5. A radio communication apparatus for performing communication with a communication destination through a communication control apparatus by using a first radio IP network which dynamically assigns a first care-of IP address according to a position of the radio communication apparatus, and a second radio IP network which assigns a second care-of IP address, the radio communication apparatus comprising:
a receiver configured to receive IP packets transmitted at predetermined intervals from the communication destination via the first radio IP network and via the second radio IP network;
a downlink bandwidth ratio calculator configured to calculate a downlink bandwidth ratio based on a received number of the IP packets from the first radio IP network and the second radio IP network received by the receiver from the communication control apparatus within a monitoring period,
the downlink bandwidth ratio indicating a ratio of a bandwidth of the first radio IP network to a bandwidth of the second radio IP network,
receiving the IP packets between completion of the monitoring period and completion of a next monitoring period based on the bandwidths of the first and second radio IP networks within the monitoring period; and
a downlink transmission controller configured to transmit, to the communication control apparatus, downlink bandwidth ratio information from which the downlink bandwidth ratio calculated by the downlink bandwidth ratio calculator is contained within.

6. The radio communication apparatus according to claim 5, wherein
the downlink bandwidth ratio calculator calculates the downlink bandwidth ratio at predetermined intervals, and
the downlink transmission controller transmits the downlink bandwidth ratio information at the predetermined intervals, based on the downlink bandwidth ratio calculated at the predetermined intervals by the downlink bandwidth ratio calculator.

7. The radio communication apparatus according to claim 5, wherein the downlink transmission controller stops transmission of the downlink bandwidth ratio information, when the downlink transmission controller determines that the first radio IP network can provide a bandwidth required to receive the IP packets between completion of the monitoring period and completion of the next monitoring period, based on the received number within the monitoring period and the downlink bandwidth ratio.

8. The radio communication apparatus according to claim 5, further comprising:
an information receiver configured to receive uplink bandwidth ratio information from the communication control apparatus, the uplink bandwidth ratio information allowing an uplink bandwidth ratio to be recognized, the uplink bandwidth ratio indicating a ratio of the bandwidth of the first radio IP network to be used for transmitting the IP packets, to the bandwidth of the second radio IP network to be used for transmitting the IP packets;
a virtual address storage configured to store a virtual address of the radio communication apparatus associated with the first and second care-of IP addresses; and
an uplink transmitter configured to transmit an IP packet including the virtual address and the first care-of IP address to the first radio IP network, or to transmit an IP packet including the virtual address and the second care-of IP address to the second radio IP network, based on the uplink bandwidth ratio information received by the information receiver.

9. A communication control method for controlling a communication path for a radio communication apparatus by using a first radio IP network which dynamically assigns a first care-of IP address to the radio communication apparatus according to a position of the radio communication apparatus, and a second radio IP network which assigns a second care-of IP address to the radio communication apparatus, the communication control method comprising the steps of:
receiving IP packets transmitted at predetermined intervals from the radio communication apparatus to a communication destination via the first radio IP network and via the second radio IP network, and relaying the received IP packets to the communication destination;
calculating an uplink bandwidth ratio based on a received number of the IP packets from the first radio IP network and the second radio IP network received from the radio communication apparatus within a monitoring period in the step of relaying,
the uplink bandwidth ratio indicating a ratio of a bandwidth of the first radio IP network to a bandwidth of the second radio IP network,
receiving the IP packets between completion of the monitoring period and completion of a next monitoring period based on the bandwidths of the first and the second radio IP networks within the monitoring period; and
transmitting, to the radio communication apparatus, bandwidth ratio information from which the uplink bandwidth ratio calculated in the step of calculating the uplink bandwidth ratio is contained within.

10. A radio communication method for performing communication with a communication destination through a communication control apparatus by using a first radio IP network which dynamically assigns a first care-of IP address to the radio communication apparatus according to a position of the radio communication apparatus, and a second radio IP network which assigns a second care-of IP address to the radio communication apparatus, the radio communication method comprising the steps of receiving IP packets transmitted at predetermined intervals from the communication destination via the first radio IP network and via the second radio IP network;

calculating a downlink bandwidth ratio based on the received number of the IP packets from the first radio IP network and the second radio IP network received from the communication control apparatus within a monitoring period in the step of receiving, the downlink bandwidth ratio indicating a ratio of a bandwidth of the first radio IP network to a bandwidth of the second radio IP network, receiving the IP packets between completion of the monitoring period and completion of a next so monitoring period based on the bandwidths of the first and the second radio IP networks within the monitoring period; and transmitting, to the communication control apparatus, downlink bandwidth ratio information from which the downlink bandwidth ratio calculated in the step of calculating the downlink bandwidth ratio is contained within.

* * * * *